(12) United States Patent
Sisson et al.

(10) Patent No.: US 7,541,091 B2
(45) Date of Patent: Jun. 2, 2009

(54) COMPARTMENTALIZED RESIN PELLETS FOR OXYGEN SCAVENGING

(75) Inventors: Edwin Andrew Sisson, Medina, OH (US); Gianluca Ferrari, Medina, OH (US)

(73) Assignee: M & G USA Corporation, Apple Grove, WV (US)

( * ) Notice: Subject to any disclaimer, the term of this patent is extended or adjusted under 35 U.S.C. 154(b) by 461 days.

(21) Appl. No.: 11/416,977

(22) Filed: May 3, 2006

(65) Prior Publication Data

US 2006/0205853 A1    Sep. 14, 2006

Related U.S. Application Data

(63) Continuation-in-part of application No. 11/130,961, filed on May 17, 2005.

(60) Provisional application No. 60/572,225, filed on May 18, 2004, provisional application No. 60/605,658, filed on Aug. 30, 2004, provisional application No. 60/613,097, filed on Sep. 25, 2004, provisional application No. 60/646,329, filed on Jan. 24, 2005, provisional application No. 60/677,829, filed on May 5, 2005, provisional application No. 60/738,489, filed on Nov. 21, 2005.

(51) Int. Cl.
*B23B 5/16* (2006.01)
(52) U.S. Cl. ........................ 428/403; 428/407; 427/212; 427/214; 264/143; 425/97
(58) Field of Classification Search ................. 428/403, 428/407; 427/212, 214; 264/143; 425/97
See application file for complete search history.

(56) References Cited

U.S. PATENT DOCUMENTS

| 4,791,965 A | 12/1988 | Wynn |
| 5,221,580 A | 6/1993 | Amory et al. |
| 5,464,676 A | 11/1995 | Hoyt |
| 5,582,913 A | 12/1996 | Simons |
| 5,627,218 A | 5/1997 | Bradt |
| 5,747,548 A * | 5/1998 | Bradt .......................... 521/57 |
| 6,344,539 B1 | 2/2002 | Palmer |
| 6,406,766 B1 * | 6/2002 | Rotter et al. ................ 428/35.7 |
| 6,669,986 B1 * | 12/2003 | Mushiake et al. ........... 427/214 |

FOREIGN PATENT DOCUMENTS

| EP | 1236790 | 9/2002 |
| JP | 59081121 | 5/1984 |
| JP | 2000351117 | 12/2000 |

* cited by examiner

*Primary Examiner*—Leszek Kiliman
(74) *Attorney, Agent, or Firm*—Edwin A. Sisson, Attorney at Law, LLC (57) ABSTRACT

Disclosed is a process and article to simultaneously thermally treat at least two thermoplastics when one of the thermoplastics is an oxygen inert material and the other is an oxygen sensitive material, and the article also contains a promoter that converts the oxygen sensitive material to an oxygen reactive material when brought in contact with the oxygen sensitive material. The process utilizes the compartmentalized pellet, also known as a zoned pellet, construction wherein the major amount of each component is located within individual compartments or zones of the pellet such that the reactions with compounds in the atmosphere such as oxygen are less than the reaction if the thermoplastics were homogeneously dispersed in the pellet. This is of particular use to oxygen scavenging systems.

67 Claims, 4 Drawing Sheets

COMPARTMENTALIZED RESIN PELLETS FOR OXYGEN SCAVENGING

PRIORITIES AND CROSS REFERENCES

This patent application is a continuation-in-part of pending application Ser. No. 11/130,961 filed May 17, 2005 which claims priority of U.S. Provisional Patent Application Ser. No. 60/572,225 filed May 18, 2004; U.S. Provisional Patent Application Ser. No. 60/605,658 filed Aug. 30, 2004; U.S. Provisional Patent Application Ser. No. 60/613,097 filed Sep. 25, 2004; U.S. Provisional Patent Application Ser. No. 60/646,329 filed Jan. 24, 2005; and U.S. Provisional Patent Application Ser. No. 60/677,829 filed May 5, 2005. This patent application claims priority from the above Non-provisional and Provisional patent applications as well as priority from U.S. Provisional Patent Application Ser. No. 60/738,489 filed Nov. 21, 2005. The teachings of these patent applications are incorporated by reference herein, in their entirety.

FIELD OF THE INVENTION

This specification relates to resin pellets that are comprised of at least two compartmentalized zones in a side-by-side configuration.

BACKGROUND OF THE INVENTION

Many industrial articles are comprised of multiple components to economically improve their properties. Multi-component articles made from thermoplastic and thermoset materials are generally manufactured with a final melt-mixing extruder that homogenously combines the various components into an article such as a sheet, film, fiber, a bottle or an injection molded part, frequently called a preform. The article, particularly the preform, is often further processed to make another article such as a bottle, tray, jar, or bag.

As packaging demands become more complex, multiple components are needed to increase the functional properties of the package. Barrier to vapor or specific compounds such as oxygen is one of the more important of these properties. Oxygen barrier materials are expensive and it is therefore desirable to minimize their cost in the final package.

Reduced rates of oxygen transmission can be achieved using passive or active barrier techniques. Passive barrier techniques reduce the transmission rate of the vapor or liquid into the package. By contrast, active barrier techniques incorporate material(s) into the wall of the package that react(s) with the vapor or liquid of concern and thus prevents their passage through the container wall.

Current packages integrate the passive barrier material into a separate layer in the wall of the container. This is accomplished by using one extruder to melt a major component and form the article while a second extruder melts the barrier material and injects the barrier material in a separate layer of the article that forms the wall of the container. One can, for example, improve passive barrier properties by incorporating a polyamide layer and a polyester layer to make a multi-layer container or one can homogeneously blend with the polyester with the polyamide in the container wall as opposed to the polyamide being placed in a separate layer.

The active barrier technique involves the reaction of a component in the wall of a container with oxygen. Such a reaction has come to be known as oxygen scavenging. U.S. Pat. Nos. 5,021,515, 5,049,624, and 5,639,815 disclose packaging materials and processes utilizing polymer compositions capable of scavenging oxygen; such compositions include an oxidizable organic component, such as a polyamide like m-xylylene adipamide (commonly referred to as MXD6) and a metal oxidation promoter (such as a cobalt compound).

U.S. Pat. No. 5,529,833 describes another organic composition comprising an ethylenically unsaturated hydrocarbon oxygen scavenger catalyzed by a promoter such as a transition metal catalyst and a chloride, acetate, stearate, palmitate, 2-ethylhexanoate, neodecanoate or naphthenate counterion. Typical metal salts are selected from cobalt (II) 2-ethylhexanoate and cobalt (II) neodecanoate.

U.S. Pat. Nos. 6,406,766, 6,558,762, 6,346,308, 6,365,247, and 6,083,585 teach to functionalize the oxidizable component such as a polybutadiene oligomer and react it into the backbone of the major polymer matrix, such as polyethylene terephthalate and/or its copolymers, (commonly referred to as PET). Such a composition may be incorporated into the wall of the container as a separate layer of the container wall or comprise the entire wall.

Elemental or reduced metal scavengers are another active barrier technique. These metals, usually in the presence of a promoter such as sodium chloride, are not reactive with oxygen until exposed to moisture that triggers the reaction. The advantage of the metal scavenger is that a pellet containing a metal based scavenger will not react with oxygen unless placed in contact with moisture, a component that is external to the pellet. The use of an agent external to the pellet composition to initiate the reaction makes this a triggerable system. This is in contrast to the previously discussed organic systems which are active when the ingredients are combined to make the container or pellet. It is noted that there are some oxygen reactive compounds that have both an inherent reactivity with oxygen and also have a promotable and/or a triggerable reactivity as well.

Solid phase polymerization efficiently increases the molecular weight, as measured by intrinsic viscosity of both polyesters and polyamides. In the solid phase polymerization process the pellets are exposed to temperatures less than the temperature at which the pellets become liquid. This temperature exposure occurs in the presence of a driving force such as an inert gas or vacuum. The by-products of the polymerization reaction are removed from the pellet thus forcing an equilibrium increase in the molecular weight of the polymer. Because the polyester and polyamide are both pelletized during manufacture, U.S. Pat. No. 5,340,884 advocates combining them at the point where one or the other pellet is cut during its original manufacture. Combining the polyester and polyamide where one or the other is cut into pellets eliminates a subsequent extrusion and cutting step. However, combining the polyester and polyamide at the first cutting step requires that the subsequent polyester-polyamide multi-component pellet be subjected to and survive the thermal processing steps of crystallization, solid phase polymerization and drying. These thermal processing steps can occur from 40° C. to a temperature slightly less than the temperature at which the pellet becomes liquid, such as 1° C., or for more typically for commercial reasons, 5° C. below the temperature at which the pellet becomes liquid.

While U.S. Pat. No. 5,340,884 advocates combining the polyester and polyamide at the first cutting step, it notes that homogenously dispersed combinations of the polyamide and polyester in masterbatches, concentrates and pre-compounds cannot be exposed to solid phase polymerization conditions without destroying the molecular weight of the polyamide and bringing on dramatic color shifts. U.S. Pat. No. 5,340,884 minimizes this by using a pre-compounded polyamide concentrate to be blended with the polyester. While a pre-compounded concentrate may reduce some of the effects of subsequent thermal processing, it is not very effective. The polyamide-polyester concentrate suffers the same problem as the separate polyester polyamide pellets dried together.

The problem is compounded in the case of the organic scavenging system where the oxidation promoter is added when the polymers are melt blended. The system is reactive to oxygen and any subsequent thermal treatment, and even storage, must be done in the absence of oxygen.

In a crystallization process, the material in the pellet moves from being substantially amorphous to crystalline. Polymer pellets are usually amorphous but will crystallize when subjected to heat and time. Crystallinity is often expressed as percent crystallinity and is often interpolated by dividing the difference between the density of the material and the amorphous density of the material by the difference between the 100% crystalline density and the amorphous density (0% crystallinity). For polyethylene terephthalate or the polyethylene terephthalate copolymer, the amorphous density is 1.335 gm/cm$^3$, the crystalline density is 1.455 gm/cm$^3$ and the expression therefore for a given sample is:

$$(Ds-1.335)/(1.455-1.335)$$

where Ds is density of the sample in gm/cm$^3$.

Crystallinity levels can also be determined by differential scanning calorimetry (DSC or D.S.C.) which relates the amount of heat required to melt the material to the amount of heat required to melt a sample of 100% crystallinity.

Pre-compounding oxygen reactive components into a pellet suffers the same limitations as the polyester-polyamide blend. Pre-compounding of oxygen reactive pellets is particularly expensive because the pre-compounded pellets are reactive with oxygen and must be processed, stored and transported in the absence of oxygen. Oxygen reactive pellets are therefore packaged in the absence of oxygen under nitrogen into sealed foil bags.

Additionally, the pre-compounded oxygen reactive pellet does not work for post thermal treatments, such as drying, crystallizing or solid phase polymerizing. A pre-compound of a polyester and an oxygen reactive material must be dried prior to final melt mixing. Thus, the pellets must be able to withstand the drying process. Drying with hot air significantly depletes the capacity of the oxygen reactive material to consume oxygen.

U.S. Pat. No. 6,406,766 teaches that post polymerization processes such as drying, devolatilization, crystallization, and solid state polymerization diminish the oxygen scavenging capability and teaches that the loss of oxygen scavenging activity can be minimized by performing such operations in the strict absence of oxygen and limiting the copolymer's exposure to oxygen after such operations.

In spite of its limitations, the current industrial approach pre-compounds an oxygen sensitive material with a promoter/catalyst in a masterbatch containing the major component of the finished article to create an oxygen reactive material, ships the oxygen reactive material in foil bags and subsequently dries the masterbatch in the presence of nitrogen or vacuum just prior to addition into the final melt mixing extrusion process.

One alternative utilizes separate pellets: one pellet containing the oxygen sensitive component and the other pellet containing the major component and the promoter. Accurate metering of the components is difficult because of stratification caused by various specific gravity and electrostatic properties of the pellets and pre-compounding the oxygen sensitive component with the other components and adding the promoter/catalyst during the final melt mixing step may eliminate storage costs but reintroduces the metering difficulties and separate feed systems.

U.S. Pat. No. 5,627,218, and U.S. Pat. No. 5,747,548 describe a compartmentalized (zoned) pellet wherein interactive or interreactive components are kept in separate compartments or zones of the pellet until the final melt mixing step. Interactive/interreactive components are chemical reactants which are thermally activated to participate in a chemical reaction upon utilization of the pellet in a molding operation. The type of reaction classified as interactive or interreactive are those components that have reactions which must be carried to completion so that the products can be standardized and macromolecular growth limited during molding to prevent the product from becoming too stiff to mold. By contrast, the compartmentalized pellet composition of U.S. Pat. No. 5,627,218 utilizes the slowness of reactions to permit easy mold fill before the reaction converts easy flow materials into less easy flow materials. The reaction rates of the interreactive/interactive compounds are almost universally slow. Upon melt mixing, the interreactions of the contained materials begin. The reaction times of the pellet contained reactants is generally long in comparison to the time required for the molding or extrusion process. The resulting increase of molecular size and linkage complexity enhances physical properties and largely takes place after the material is formed into final shape. Post molding cure can be allowed to take place slowly or an oven cure can be affected at any time.

Reactive extrusion processing is typical of thermosets. While in theory some polyester-polyamides may slightly react in what is known as trans-amination, the reaction would be very rapid and would certainly not build molecular weight or increase viscosity, nor would it continue after the melt-extrusion step. It is known that polyethylene terephthalate does not react with poly m-xylylene adipamide, MXD6.

U.S. Pat. Nos. 5,627,218 and 5,747,548 teach that the compartmentalized pellets contain one or more chemical reactants which are thermally activated to participate in a chemical reaction upon utilization of the pellets in a molding operation. Catalysts which enhance the reaction may also be included. In addition to at least two chemical reactants, the patents also contemplate non-chemically reactive additives such as reinforcing fibers, colors, lubricants and the like.

By keeping the interactive/interreactive components separate until melt mixing, a single pellet is used and the complicated feeding systems associated with the final melt-mixing step are avoided. Neither U.S. Pat. No. 5,627,218 nor U.S. Pat. No. 5,747,548 contemplates or discloses the use of a compartmentalized pellet when the reaction is with a compound external to the pellet, such as oxygen.

U.S. Pat. No. 6,669,986 discloses the use of the compartmentalized pellet to aid in the drying of non-crystallizable polyesters by surrounding them with a crystallizable polyester to prevent blocking or sticking. To accomplish this, U.S. Pat. No. 6,669,986 teaches that the components must be chemically similar to have utility upon subsequent melt processing. U.S. Pat. No. 6,669,986 neither discloses nor contemplates using the compartmentalized pellet to protect the products from the reaction with an external compound such as the oxygen in air.

U.S. Pat. No. 6,669,986 also discloses protecting the ingredients of the pellet from water when the water triggers the reaction of a metal based oxygen scavenger. As discussed earlier, this is protection from a triggering mechanism and does not disclose protection from reacting with a compound or when the promoter is within the pellet. However, U.S. Pat. No. 6,669,986 does not teach protection of the components from reacting with oxygen.

U.S. Pat. Nos. 5,747,548 and 6,669,986 both describe the types of compartmentalized or zoned pellets and how to make such compartmentalized or zoned pellets. Examples of compositions not contemplated by the prior art are those pellet compositions when at least one of the components reacts with compounds in the environment such as the oxygen found in air.

SUMMARY OF THE INVENTION

Disclosed is a process and configured articles to simultaneously thermally process at least three compounds when the three compounds comprise an oxygen sensitive component, an oxygen inert component and a reaction promoter wherein the oxygen sensitive component is present in a first compartmentalized zone, and wherein the oxygen inert component is present in a second compartmentalized zone and the first compartmentalized zone and second compartmentalized zone are configured in a side-by-side configuration whereby neither zone surrounds the other zone in any plane of the pellet.

The specification further reveals a process for thermally treating a resin pellet comprising a an oxygen sensitive compound, an oxygen inert compound, and a reaction promoter, wherein the oxygen sensitive compound is present in a first compartmentalized zone and wherein the oxygen inert component is present in a second compartmentalized zone comprising heating the resin pellet to a temperature which is within the range of 40° C. to a temperature which is at least 1° C. below the temperature at which the pellet becomes liquid.

DETAILED DESCRIPTION

The compartmentalized configuration described in detail below has utility for oxygen reactive systems by allowing them to undergo subsequent post thermal treatment operations in an oxygen environment such as air which include but are not limited to drying, devolatilization, crystallization, solid state polymerization and storage.

The pellet of the compartmentalized configuration contains at least one oxygen inert polymer, such as a polyester, at least one oxygen sensitive component, such as a polyamide or a polyester containing polybutadiene monomers, and at least one reaction promoter, such as a cobalt compound, which when said reaction promoter is placed in contact with the oxygen sensitive component may initiate and/or catalyze, the reaction of the oxygen sensitive component with oxygen and thus making the oxygen sensitive component an oxygen reactive component.

For the purposes of this specification, the component that reacts with oxygen is known as an oxygen reactive component or oxygen scavenger. The reaction of the component with oxygen is often promoted by an additional component that is also present in the wall of the package. A component that becomes reactive to oxygen when in the presence of a promoter is called an oxygen sensitive component. The promoter usually initiates and often catalyzes the reaction of the oxygen sensitive component with oxygen. After the oxygen sensitive component is exposed to the promoter and becomes reactive with oxygen, the oxygen sensitive component becomes an oxygen reactive component. The oxygen sensitive/reactive component may be organic, inorganic or a metal in a reduced valence state.

In contrast, the phrase oxygen inert component refers to a component which does not become reactive with oxygen when placed in contact with the promoter at levels that make the oxygen sensitive component an oxygen reactive component. This can easily be determined by combining the oxygen sensitive component with the promoter and measuring the oxygen consumption. The proposed oxygen inert component is then combined only with the promoter and the oxygen reactivity measured. It has been observed that most organic compounds exhibit some very small inherent amount of reactivity to oxygen. An oxygen inert component should exhibit little increased reactivity with oxygen in the presence of the promoter. A good guide is that the oxygen inert component in the presence of the promoter have only twice the reactivity with oxygen than the oxygen inert component in the absence of the promoter. While twice the reactivity of the oxygen inert component with oxygen is acceptable, the preferred amount of oxygen reactivity is that the oxygen inert component with the promoter should show less than a 20% and preferably less than 10% increase, and preferably no increase, in oxygen consumption than the oxygen inert component without the promoter. The slightly higher increase may be caused by trace amounts of catalyst, contaminants, or even the promoter which in and of itself may react with oxygen to a small degree.

Figure 1:
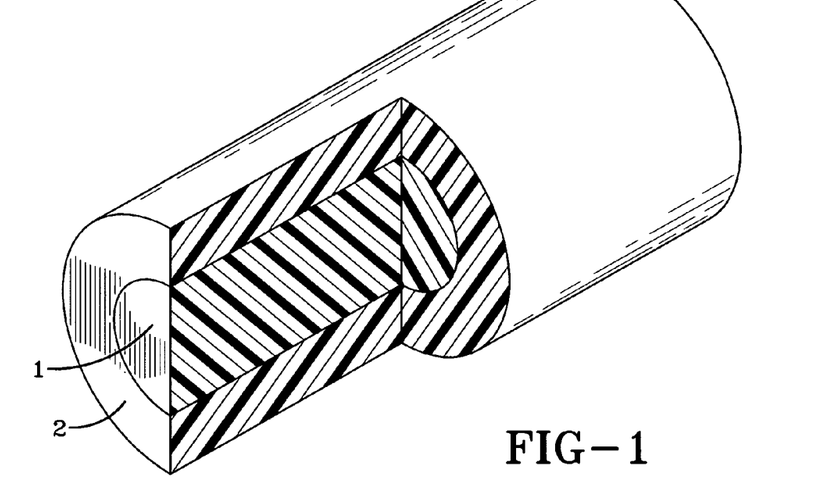
FIG. 1 depicts a resin pellet with two compartments or zones in the core-sheath configuration.

In the basic conceptual embodiment of FIG. 1, the oxygen inert polymer, the oxygen sensitive component and promoter are heterogeneously placed in zones or compartments of the pellet so that there is an insufficient amount of promoter in direct contact with the oxygen sensitive component to substantially initiate or catalyze the reaction with oxygen, but there is more than enough promoter to do this when the ingredients are homogenized when mixed during the final melt extrusion step.

The promoter and oxygen sensitive component can be substantially heterogeneously placed into pellets as opposed to being homogenously dispersed or solubilized in each other. In one embodiment, the oxygen sensitive component is placed in one compartment (see for example elements 5A1, 5B1, and 5C1 of FIGS. 5A, 5B, and 5C) and the promoter disbursed into the oxygen inert component labeled 5A2, 5B2, and 5C2 of FIGS. 5A, 5B, and 5C in amounts sufficient to initiate and/or catalyze the reaction of the oxygen sensitive component with oxygen when the pellet is processed in the final melt mixing step. With this configuration the oxygen sensitive component should remain essentially unreactive with oxygen until it is combined with the promoter during the final melt mixing. The pellet of the invention can now be stored in an oxygen containing environment such as air and be subjected to thermal treatments in the presence of oxygen because the oxygen sensitive compound exhibits little or no reactivity with oxygen until final melt mixing.

The oxygen reactive compound can be one of many compounds. The oxygen reactive compound of this particular embodiment is an oxygen sensitive component that requires a reaction promoter to initiate or catalyze the reaction with oxygen. Active Food Packaging, M. L. Rooney ed., 1995, p 74-110, the teachings of which are incorporated herein by reference, describes various types of oxidizable organic oxygen sensitive compounds. The oxygen sensitive compounds are generally ethylenically unsaturated organic compounds and may have at least one allylic hydrogen which is cleaved in the presence of oxygen and a promoter which is an initiator or catalyst.

In this context a catalyst can be an initiator but an initiator is not always a catalyst. Generally, the reaction with oxygen is very slow or non-existent without the presence of the initiator or catalyst. An initiator is anything which starts the fast reaction of the compound with oxygen. A catalyst can both start the reaction and increase the rate of the reaction but does not participate in the reaction.

Polyamides, like polyolefins, become reactive with oxygen in the presence of a transition metal catalyst and are therefore also oxygen sensitive components. Thus, polyamides are also one of the preferred oxygen sensitive components. Specifically, the polyamides described later are suitable oxygen sensitive components. Of those polyamides, the m-xylylene adipamide moiety (MXD6) is preferred. Polybutadiene, polybutadiene oligomers and terpenes are other examples of oxygen sensitive materials that are promoted (initiated and/or catalyzed) by a transition metal catalyst.

Other examples of oxidizable organic compounds include polybutadiene, unhydrogenated polybutadiene oligomers, polypropylene oxide oligomers, and methyl pendant aromatic compounds. Many forms of polybutadiene will work including those with high-cis, high-vinyl and syndiotatic microstructures.

In addition to being physically blended with the major component, the oxygen sensitive component can be chemically functionalized in one or more areas and reacted with a material compatible with the major component. Functionalization can place for example at least one carboxyl, hydroxyl, or amine group in the moiety. Preferably there are two functional groups occurring at each end of the moiety. The types of materials compatible with the polyester are the reaction product of predominately polycondensate segments selected from the group consisting of polyesters as recited in USA 21 CFR 177.1590 and polyamides with a minor amount of oxygen sensitive component segments selected from the group consisting of functionalized polybutadiene, unhydrogenated polybutadiene oligomers, polypropylene oxide oligomers and methyl pendant aromatic compounds. USA 21 CFR 177.1590 describes the polycondensates as polyester elastomers produced by the ester exchange reaction when one or more of the following phthalates—dimethyl terephthalate, dimethyl orthophthalate, and dimethyl isophthalate—is made to react with alpha-hydroomega-hydroxypoly (oxytetramethylene) and/or 1,4 butanediol such that the finished elastomer has a number average molecular weight between 20,000 and 30,000. These condensates can also be described as a polycondensate comprised of one or more phthalates selected from the group consisting of terephthalate, orthophthalate, and isophthalate, wherein said polycondensate is further comprised of one or more glycols selected from the group consisting of alpha-hydro-omega-hydroxypoly (oxytetramethylene) and 1,4 butanediol, and the polycondensate has a number average molecular weight between 20,000 and 30,000. The alpha-hydro-omega-hydroxypoly (oxytetramethylene) is the polymeric form of the 1,4 butanediol. Monoethylene glycol (ethylene glycol) and its polymer also known as polyethylene glycol are also suitable.

Usually, the best compatibility is obtained when the oxygen scavenging material is reacted with the major component itself. Thus making those molecules containing the oxygen scavenging material oxygen sensitive components with the molecules without the oxygen scavenging material being oxygen inert components. U.S. Pat. No. 6,406,766 describes how this can be accomplished. Because U.S. Pat. No. 6,406,766 teaches reacting the functionalized polybutadiene into the polyester segment, its inventors view the functionalized polybutadiene as a monomer to the polyester segment. For purposes of this disclosure, the term functionalized polybutadiene is an equivalent to the term polybutadiene monomer found in U.S. Pat. No. 6,406,766. Preferably the functionalized oxygen scavenger is reacted with the same type of material as the major component. In other words, the best compatibility with polyethylene terephthalate is obtained when the functionalized oxygen scavenger is reacted with polyethylene terephthalate or a polyethylene terephthalate copolymer.

The promoter is an initiator or catalyst and is any compound that starts and/or accelerates the reaction of the oxygen sensitive component with oxygen. The promoter is usually a transition metal, most preferably a cobalt salt, such as cobalt neodecanoate and is not consumed by the reaction of the oxygen sensitive material with oxygen. Additionally, the oxygen sensitive component is sufficiently unreactive to oxygen unless the promoter is present in sufficient quantities. The promoter may also require an event external to the pellet such as radiant energy (light, UV light, microwave) or contact with another substance such as water to initiate the reaction with oxygen or release the initiator.

The amount of promoter is usually experimentally determined based upon the amount of oxygen consumption required, the type of oxygen sensitive component, and the type of promoter. In a general sense, the amount of promoter varies between 30 and 1000 ppm of the metal ion to the oxygen sensitive component. However, values between 50 and 500 ppm and 100 to 300 ppm metal ion by weight of the oxygen sensitive component have also been known to promote the reaction with oxygen.

Another embodiment is an compartmentalized pellet with a high concentration of oxygen sensitive component next to a layer of the oxygen inert component containing at least some of the promoter. For example, a side-by-side pellet may comprise a first zone comprising 95% of the volume of the pellet, comprising the oxygen sensitive material such as a polyamide and/or the polybutadiene structure, and further comprising a second zone comprising 5% of the volume, wherein the second zone comprises the oxygen inert material and the promoter. While the configuration is not limited to the following configurations are within the scope of this invention, the pellet could be configured in the annular form (FIG. 1), the core-sheath of FIG. 2, the multiple annular form of FIG. 3, the sandwich form of FIG. 4, and any of the variations of the side-by-side configuration of shown in FIG. 5. This pellet could be subjected to all the thermal processes with the polyester pellets or it could be added at the dryer feeding the extruder, and the pellet can be stored in an oxygen environment without initiating the reaction of the oxygen sensitive component with oxygen.

Figure 2:
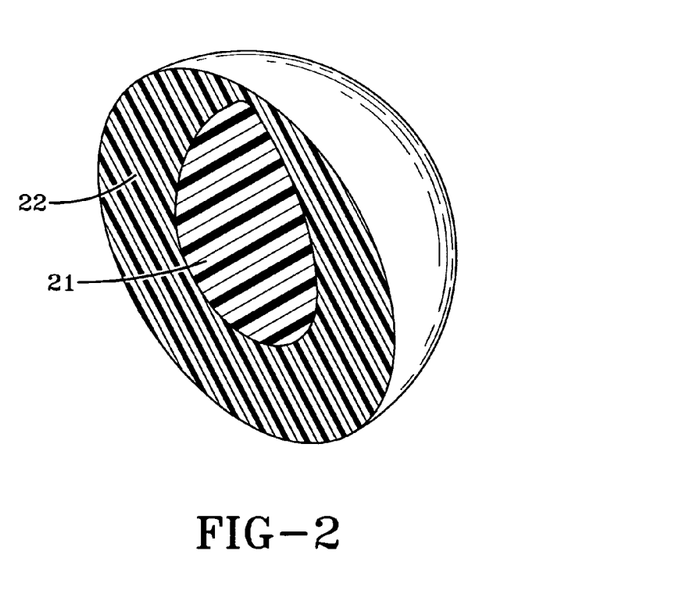
FIG. 2 depicts a resin pellet with two compartments or zones in the core-sheath configuration where the core is encapsulated, surrounded, or enclosed by an outer sheath layer.
Figure 3:
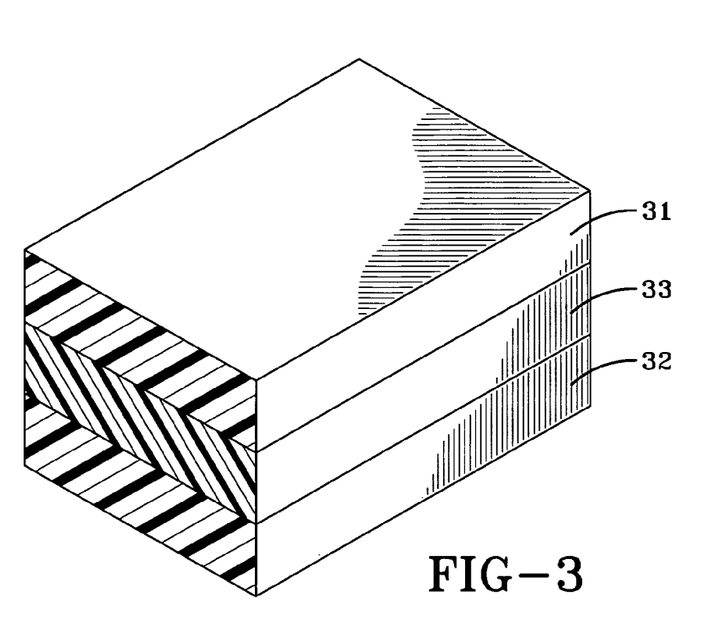
FIG. 3 depicts a resin pellet with three compartments or zones in a multi-layered or sandwich configuration.
Figure 4:
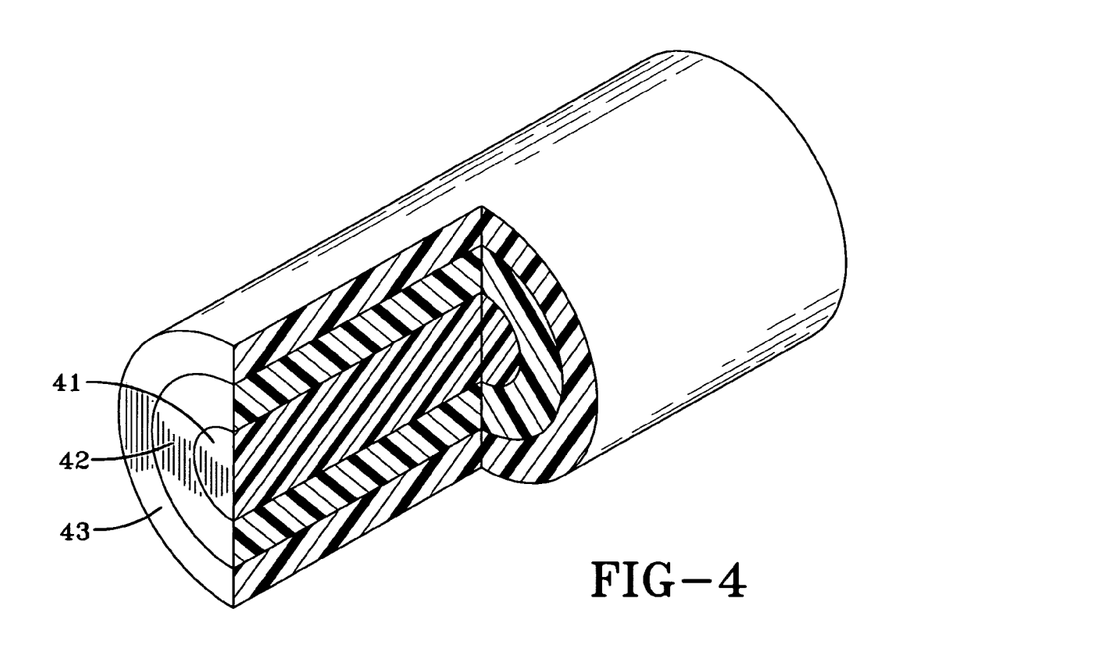
FIG. 4 depicts a resin pellet of three compartmentalized zones configured in two concentric layers surrounding a core.
Figure 5A:
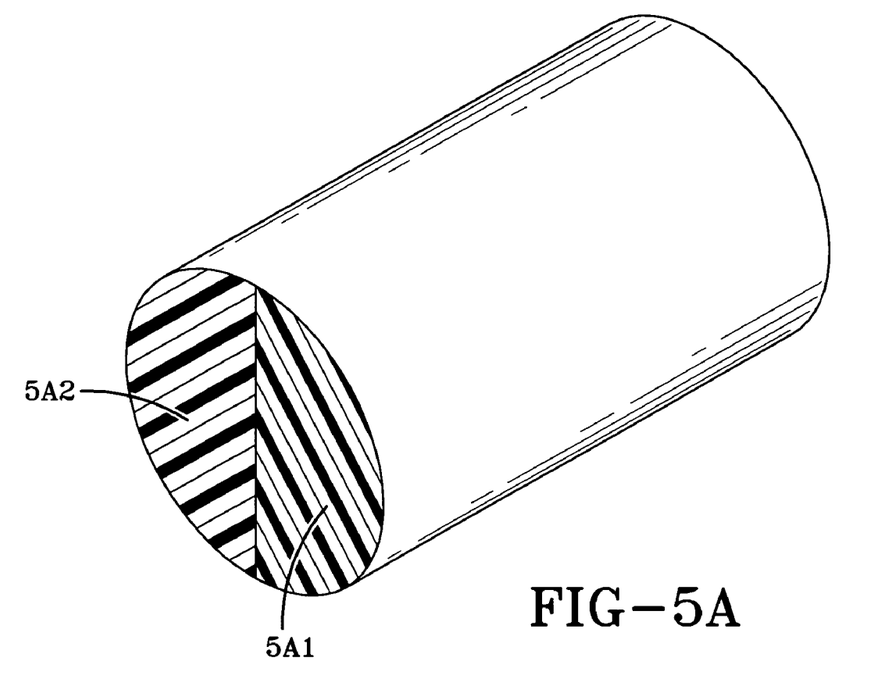
FIGS. 5A, 5B, 5C depict examples of various resin pellet configurations of two compartments, where the compartments lay beside each other in what is called the side-by-side configuration.
Figure 5B:
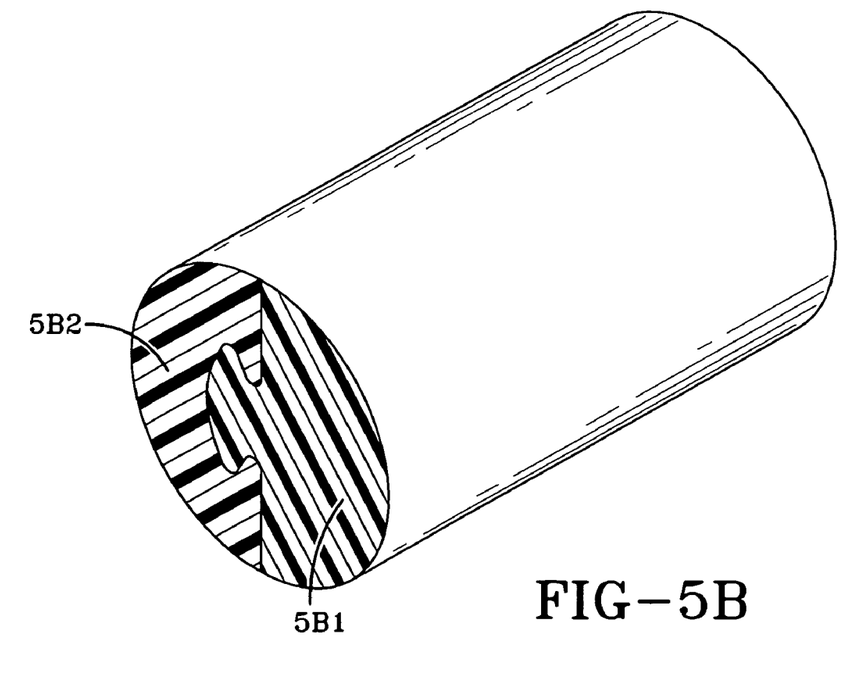
Figure 5C:
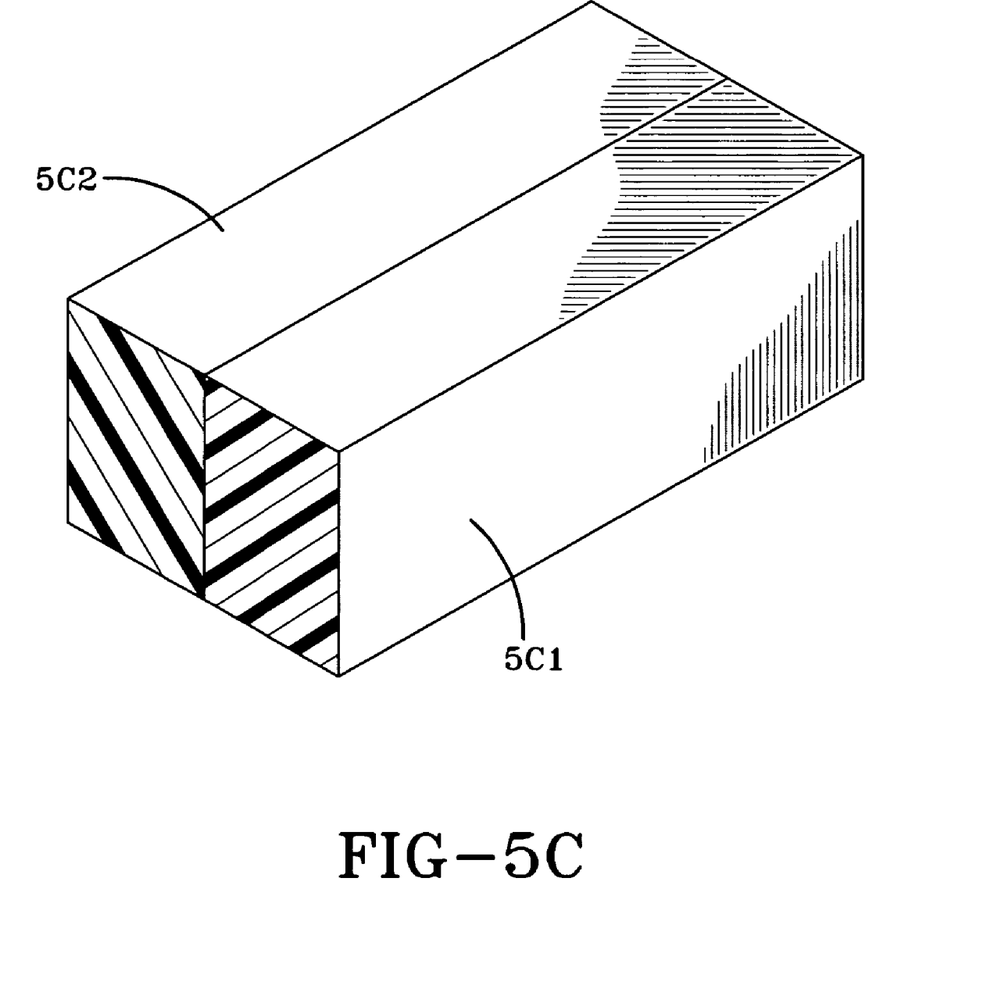

One embodiment is to place the un-promoted oxygen sensitive component, preferably a polyamide such as MXD6, unhydrogenated polybutadiene oligomers or unhydrogenated polybutadiene oligomers reacted into a polyester backbone into one component of the pellet and place the cobalt promoter and polyester into the other component. FIG. 1 shows this for a core-sheath configuration, FIG. 2 shows it for the core sheath where the core is surrounded. FIG. 3 shows this in a sandwich configuration and FIG. 4 shows the configuration with multiple configurations. FIGS. 5A, 5B, and 5C show non-limiting variations of the side-by-side configuration. A distinguishing feature of the side-by-side configuration is that unlike the annular, core-sheath, or encapsulated configurations, that in the side-by-side configuration, neither zone surrounds the other zone in any imaginary plane drawn through the pellet.

As shown in FIG. 3 and FIGS. 5A, 5B, and 5C, it should be apparent that these structures meet the above criteria. There is no plane passing through the pellet, in any direction which would contain both zones and have one zone completely surround the other zone.

Under the compartmentalized configuration, the promoter, usually a cobalt compound, stays in the polyester (oxygen inert) phase until the final melt-mixing step at which time the oxygen sensitive component is dispersed throughout the polyester and comes into intimate contact with the cobalt salt thereby initiating and catalyzing the reaction of oxygen with the oxygen sensitive component. At this point, the oxygen sensitive component becomes an oxygen reactive component.

One skilled in the art will recognize that the amount of promoter may be minimized by determining the maximum level of promoter which can be added to the oxygen sensitive component yet not significantly promote the reaction with oxygen and determining the total amount of promoter needed to promote the reaction under complete dispersion of the oxygen sensitive component in the oxygen inert component and placing at least the remaining amount of promoter in the polyester sheath.

It is also worth noting that the functionalized (unhydrogenated) oxygen sensitive/reactive component may be present in two forms. First, it may be present as a functionalized material that has not yet been reacted into the polymer backbone. The reaction into the backbone of a component in another compartment would occur during final melt-mixing.

For clarity, some embodiments may be pellets that also have interactive/interreactive components in addition to reaction to by-products and/or oxygen. The oxygen sensitive or oxygen reactive component may or may not be one of those interactive/interreactive components. A feature is the presence of a promoter of the reaction of the oxygen sensitive component with compounds external to the pellet, such as oxygen, and that the promoter is kept separate from the oxygen sensitive compound or that the promoter in contact with the oxygen sensitive compound be low enough to not initiate the reaction with oxygen so that either embodiment reduces the rate of oxygen reactivity of the pellet at room temperature (23° C.+/−5° C.) by 20% over a control pellet. The control pellet is the a pellet of the same approximate size and composition, but wherein the components are homogenously dispersed.

The lack of oxygen reactivity of the compartmentalized zoned pellet structure is demonstrated in example series I. The oxygen reactivity of the zoned structure (IC) containing PET, the oxygen sensitive component (MXD6) and the oxygen reaction promoter (cobalt neo-decanoate) is similar to the control (IA) containing just PET and the oxygen sensitive component. The amount of oxygen reacted after the first day is virtually the same with compartmentalized structure showing no increase in consumption over the seven day period. It is believed that the low result in the seventh day of the control is due to the fact that that sample was not placed into the vial until some time after the manufacture. During this time the small amount of inherent oxygen reactivity had already occurred.

By comparison, the comparative example (IB) reacted with or consumed almost twice the amount of oxygen in the seven day period. The retention of the oxygen scavenging capability is demonstrated in example ID which is the zoned structure of IC repelletized to mix all the ingredients. In this manner, the components are separated until they are ready to be combined at the last possible moment and the oxygen sensitive material is converted to an oxygen reactive material.

It is noted that the experimental results were carried out on the core-sheath structure corresponding to FIG. 1, but it is believed that similar results are achieved when cast into the side-by-side configurations like those in FIGS. 5A, 5B, and 5C.

Drying, crystallization and solid phase polymerization are thermal processes that also benefit from this invention. The thermal processing envisaged in this invention occurs below the temperature at which the pellet's contents become sufficiently liquid so as to cause the zones to intermingle. Heating the pellet until all the thermoplastic components in the pellet are liquid is known as extrusion processing. Although extrusion processing is a type of thermal processing, it is not the type of thermal processing practiced in accordance with this invention and is therefore excluded. As used herein, therefore, the phrase "rapidly heating the pellet so that a sufficient amount of the pellet's contents become liquid such that the zones intermingle" is not a thermal treatment envisioned for the invention.

The following embodiments demonstrate that the problems of reacting with oxygen during storage or thermal treatment can be significantly reduced, if not eliminated, through proper placement of the components into zones or compartments of a pellet with compartmentalized or zoned construction. In one embodiment, the oxygen sensitive components are kept unreactive with external materials such as oxygen until final melt mixing.

U.S. Pat. Nos. 5,627,218 and 5,747,548 teach many techniques for manufacturing compartmentalized pellets. In one embodiment, there are at least two zones, or regions in the pellet, usually a core and a sheath. However, for the side-by-side configuration the material is cast into two strands or two layers.

All the compartmentalized pellets are obtained using at least two extruders. If a third material in another zone is desired, an additional extruder is required. The first extruder supplies the liquid feed forming the first zone which is linearly extruded. For the core-sheath design, the core is placed at the center of the strand. At the same time, the second material is extruded in the second extruder into the second zone. In the core-sheath layer design, the second zone would be the sheath layer which concentrically covers the core. In the side-by-side configuration, the first zone is cast next to the second zone. In the interlocking side-by-side configuration as depicted in FIG. 5B, the die is configured to produce the two interlocking strands. The placement of the promoter depends upon which zone contains the oxygen sensitive material. While it is preferred that the entire amount of the promoter be placed into the zone which does not contain the oxygen sensitive material, as explained later, it also contemplated that some of the promoter be placed into the zone containing the oxygen sensitive material.

In the side-by-side configuration, the first zone would be co-extruded next to the the second zone, or in the interlocking structure as demonstrated in FIG. 5B.

U.S. Pat. No. 6,669,986 discloses a multiple hole die apparatus to manufacture a core-sheath pellet. FIG. 1 depicts the core-sheath compartmentalized pellet having a core 1 which is substantially covered by a sheath 2. In this embodiment, the polyester would be extruded into the outer sheath 2 and the oxygen sensitive material (e.g. MXD6, polybutadiene oligomers) extruded into the core 1. It is apparent to one skilled in the art that the strand could consist of more than two annular concentric layers, such as FIG. 4. This could be accomplished by using another extruder and different die.

The first step is to extrude a multilayer strand. In the core-sheath configuration, one component is extruded in the center of the pellet and the other component is extruded around the center component. In the side-by-side configuration, the two zones are extruded side-by-side. The extruded multilayer strand is cut by a pelletizer before or after it is cooled, as required, and formed into multilayer pellets.

The strand is then cooled. For example, the strand can be immersed in a water tank with cool water. The water-cooled multilayer strand is preferably sent to the pelletizer after removing surface moisture, often done by a spin dryer.

The pelletizer cuts the multilayer strand into a specified length by driving a rotary knife, or the like.

In general, multilayer pellets with an outside diameter of about 2 to 8 mm are manufactured. The present invention is also not limited to pellets made from strands. For example, as revealed in U.S. Pat. No. 5,627,218, the thermoplastic polymers can be cast into layered sheets that are then cut in a cube form as well. In the sandwich or layered construction such as FIG. 3, there are generally three layers wherein the middle layer 33 is sandwiched between a first outer layer 31 and a second outer layer 32.

The co-extruded side-by-side stranded pellet is the same structure as the two layer side-by-side sheet cut into the cube, the only difference being the manufacturing route.

The compartmentalized zones can be classified as a first compartmentalized zone, a second compartmentalized zone, and sequentially labeled with each increasing zone number. For instance, a core-sheath design has a minimum of two compartmentalized zones. The core sheath design could have more zones depending upon the number of concentric rings. The side-by-side could also have sheath surrounding two side-by-side configurations.

The size of the compartmentalized zone distinguishes it from a zone associated with a homogenous dispersion. The homogenous dispersion creates zones, but they are finely divided with each zone representing a very small percentage of the total volume of the pellet. The compartmentalized zone will be a much greater percentage of the total volume.

This is easily demonstrated using the core sheath shown in FIG. 1. The percentage of the volume of the compartmentalized zone (core) relative to the whole pellet is the ratio of the diameter of the core squared to the diameter of the cylindrical portion of the pellet squared. The ratio of the radii squared works just as well. This ratio can be estimated by looking at the extrusion die and using the ratio of the diameters of the holes casting the strand. The actual ratio can be measured by SEM (scanning electron microscopy), microscopic examination, or separation of the components and calculating the required volume associated the density adjusted weight of the recovered components.

To be a compartmentalized zone, the volume of the zone must be at least 0.001 percent of the total volume of the pellet. In practicality, 0.01 volume percent is more preferred, with at least 0.1 volume percent the most preferred.

One embodiment is the side-by-side design wherein one side comprises m-xylylene adipamide polyamide (MXD6) with a number average molecular weight between 4000 and 50,000 and the sheath comprises a polyester, specifically polyethylene terephthalate or polyethylene terephthalate copolymer with an Intrinsic Viscosity (I.V.) between 0.4 and 1.2 dl/g. Once the pellet is made, both materials can then be further processed under standard conditions of crystallizing, solid phase polymerization or drying in air without imparting a significant color shift to the finished article when compared to a control which has had the MXD6 homogeneously dispersed in the polyester and subjected to the same thermal treatment.

It is specifically contemplated that the side-by-side configured pellet comprise at least one component with an I.V. between 0.2 and 1.2 dl/g. For example one could use a film forming polyester of at least 0.45 dl/g, an intermediate feed I.V. of 0.49 to 0.59 dl/g, more preferably 0.52 to 0.56 dl/g. The pellet could also use a polyester bottle resin of feed I.V. ranging from 0.59 to 0.69 dl/g, more preferably 0.61 to 0.64 dl/g, with a typical I.V. for bottles ranging from 0.72 to 0.84 dl/g, more preferably 0.74 to 0.82 dl/g. For packaging trays the typical I.V. ranges from 0.85 to 1.02 dl/g, more preferably from 0.89 to 0.95 dl/g. It is noted that while the measured I.V. of a polymer is a single value, that value represents the composite of the various molecule chain lengths. The typical I.V. increase during thermal processing is at least 0.1 dl/g, but can be as high 0.2 or even as high as 0.4 dl/g.

The configuration is indifferent as to whether the materials are crystalline or amorphous. For example, a pellet with a side of a 0.49 I.V. PET cast next to or side-by-side a component comprising MXD6 nylon with number average molecular weight 25,000 (MXD6—Grade 6007 from Mitsubishi Gas Chemical) prior to crystallization is one of the embodiments. That same pellet after crystallization is one of the embodiments, as is the same pellet which has been solid phase polymerized and the PET I.V. is now 0.84 and the number average molecular weight of the MXD6 nylon has also increased. The drying of a pellet which has been solid phase polymerized is also one of the envisioned embodiments of the thermal processes.

Also envisioned is substituting the polybutadiene or other oxygen sensitive organic compounds for the MXD6 in the previous embodiments. This would include the functionalized species whether or not it has been reacted into another polymer chain.

One skilled in the art will recognize that molecular weight is often increased during thermal treatment and that a component's location in the pellet will influence the rate of I.V. increase. Once the final molecular weight has been decided for each component, the person skilled in the art will select a lower starting molecular weight of each respective component such that the final molecular weight of each component after thermal processing is the desired molecular weight of each component required of the final article. This starting I.V. can be easily determined by traditional iterative optimization techniques.

One skilled in the art will also recognize that a pellet can be made which significantly different intrinsic viscosities and melt viscosities in different zones. For example, it is well known that polyfunctional co-monomers such pyromellitic dianhydride (PMDA), and pentaerythritol increase the solid phase polymerization rate of polyester and also decrease the temperature for solid state polymerization. This allows one to reduce the exposure to high temperatures for a long time. The zoned pellet with PET/PMDA in the sheath would allow processing of those materials which cannot tolerate the traditional solid phase polymerization conditions. In this embodiment the pellet is constructed with PET and the appropriate amount of PMDA in the outer sheath and the material that cannot tolerate the traditional time and temperature is in the core. Many of the acetaldehyde scavengers and barrier polymers such as poly ethyl vinyl alcohol (EVOH) are in this category. The pellet is exposed to solid phase polymerization conditions at a lower temperature or for a much shorter time, and in some cases a lower temperature for less time than the traditional conditions.

It needs to be recognized that absolute separation of the compartmentalized zones is not essential. Even though the materials may be in separate zones, there may be some oxygen sensitive material in the polyester zone and some polyester in the oxygen sensitive zone. It is the placement of the promoter and the amounts of the promoter in each zone which determines the utility of the invention.

In fact, the oxygen sensitive zone or the polyester zone may have a compatibilizer homogenously dispersed in that zone to aid in compatabilizing the oxygen sensitive material with the polyester during the final melt mixing step.

Examples of such compatibilizers for polyamide oxygen sensitive materials are found in United States Patent Application 2004/0013833 A1 which describes a low haze container which comprises at least a first layer comprising a compatibilized polymer blend, said compatibilized polymer blend comprising polyamide, PET or a PET-containing copolymer, and at least one compatibilizers selected from isophthalic acid (IPA)-modified PET and PET ionomers. The application describes other compatibilizers as well. This application describes the IPA-modified PET as preferably comprising from 1 to 6 mole percent IPA (isophthalic acid). The preferred PET ionomer is sulfonated PET. Other compatibilizers include p-toluene sulfonic acid modified PET, pyrometillic dianhydride modified PET, and maleic anhydride modified PET, acrylic modified polyolefin type ionomers and low molecular weight bisphenol-A epoxy resin-E44, trimellitic anhydride coupled using a bifunctional coupler.

The compatibilizer is an ionic compatibilizer, preferably a copolyester containing a metal sulfonate salt group. The metal ion of the sulfonate salt may be Na+, Li+, K+, Zn++, Mn++, and Ca++. The sulfonate salt group is attached to an aromatic nucleus such as a benzene, naphthalene, diphenyl, oxydiphenyl, sulfonyldiphenyl, or methylenediphenyl nucleus.

Preferably, the aromatic acid nucleus is sulfoisophthalic acid, sulfoterephthalic acid, sulfophthalic acid, 4-sulfonaphthalene-2,7 dicarboxylic acid, and their esters. The preferred range of the ionic compatibilizer is 0.1 to 2.0 mole percent by weight of the respective acid or glycol moiety.

The compatibilizer may exist as a third component in the compartmentalized pellet and may be present in any compartment. Alternatively, the ionic compatibilizer can be polymerized into the molecular chain of the polyester resin.

Suitable thermoplastic polymers for use in a compartment of the pellet include any thermoplastic homopolymer or copolymer. Examples of these include aliphatic, partially aromatic and aromatic polyamides, polyethylene terephthalate, polyethylene terephthalate copolymers, polybutylene terephthalate and its copolymers, polytrimethylene terephthalate and its copolymers, and polyethylene naphthalate and its copolymers, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylene, polypropylene, ethylene-propylene copolymers, poly(1-hexene), poly(4-methyl-1-pentene), poly(1-butene), poly(3-methyl-1-butene), poly(3-phenyl-1-propene) and poly(vinylcyclohexane). Some examples of oxygen inert thermoplastic polymers include polyethylene terephthalate, polyethylene terephthalate copolymers, polybutylene terephthalate and its copolymers, polytrimethylene terephthalate and its copolymers, and polyethylene naphthalate and its copolymers, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer.

The thermoplastic polymer used in the present invention comprises a polyester polymer or copolymer such as polyethylene terephthalate or a crystallizable copolymer of polyethylene terephthalate. A copolymer of polyethylene terephthalate or polyethylene terephthalate copolymer is also expressed as copolyethylene terephthalate. A copolymer of polyethylene terephthalate or polyethylene terephthalate copolymer is a polyester wherein at least 85% of the repeating acid units based upon the total number of acid units are derived from terephthalic acid or the diester of terephthalic acid, at least 85% of the repeating glycol units based upon the total number of glycol units are derived from ethylene glycol and the remainder of the acid and/or glycol units are derived from at least one other different repeating unit. A third, and subsequent repeating unit could be, for example, isophthalic acid, 2,6 naphthalene dicarboxylic acid, cyclohexanedimethanol, or 1,4 butane diol.

For clarification the unmodified term PET refers to polyethylene terephthalate or copolyethylene terephthalate. The modifier crystallizable refers to the ability of the polymer to be crystallized to some extent as measured by differential scanning calorimetry (D.S.C.). Typical crystallinity levels range from 5 to as high 65 percent depending upon the type of thermal treatment and nucleation techniques used. Typically a polymer will be considered amorphous when it has less than 5% crystallinity.

There are two types of crystalline structures; one is strain induced crystallinity which orders the molecules by exposing the material to force at an elevated temperature below the melt point. This type of crystallinity is also known as orientation and occurs when fibers are drawn or when bottles are stretch blown. Because of the order and orientation of the crystals, the materials with strain induced crystallinity are generally clear. Non-strain induced crystallinity occurs when the amorphous material is heated in the absence of a stress. The material will become white. This crystallinity is random in nature and is very brittle. The embodiments of this invention can be conducted on amorphous pellets (those with less than 5% crystallinity), strain induced crystalline pellets, non-strain induced crystalline pellets and pellets with both strain induced and non-strain induced crystallinity. Pellets with both types of crystallinity would come from orienting the strand during the extrusion process and then exposing the cut pellets or strand to heat sufficient to convert some of the remaining amorphous material in the pellet to a non-strain induced crystalline morphology.

It will be understood that the thermoplastic polymer suitable for use in the present invention can be made into a film, sheet, or injection molded article.

While the polymers employed in the present invention can be prepared by conventional polymerization procedures well known in the art, they can also be prepared in other manners as well. The polyester polymers and copolymers may be prepared by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. For clarity, a polymer of terephthalate, isophthalate and naphthalate with ethylene glycol, diethylene glycol and cyclohexanedimethanol contains six distinct monomers and is considered a copolymer. The diversity of the repeat units depends on the number of different types of monomers present in the initial polymerization reaction. In the case of polyesters, copolymers include reacting one or more diols with one or more diacids, and are sometimes also referred to as terpolymers. Additionally, randomization of the monomers is not necessary. A copolymer or terpolymer also refers to a polymer with different monomers be they in block or random distribution.

Suitable dicarboxylic acids include those comprising from about 6 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters.

Also included are the monomers which create polyester ionomers such as metallo-sulfonates. Included in these are the sulfonated isophthalate salts of lithium, sulfur, and phosphorous.

These acids or esters may be reacted with an aliphatic diol having from about 2 to about 10 carbon atoms, a cycloaliphatic diol having from about 7 to about 14 carbon atoms, an aromatic diol having from about 6 to about 15 carbon atoms, or a glycol ether having from 4 to 10 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

Polyfunctional comonomers can also be used, typically in amounts of from about 0.1 to about 3 mole percent. Suitable comonomers include, but are not limited to, trimellitic anhydride, trimethylopropane, pyromellitic dianhydride (PMDA), and pentaerythritol. Polyester-forming polyacids or polyols can also be used.

One non-limiting polymer example is polyethylene terephthalate (PET homopolymer) formed from the approximate 1:1 stoichiometric reaction of terephthalic acid, or its ester, with ethylene glycol. Another preferred polyester is polyethylene naphthalate (PEN homopolymer) formed from the approximate 1:1 to 1:1.6 stoichiometric reaction of naphthalene dicarboxylic acid, or its ester, with ethylene glycol. Yet another preferred polyester is polybutylene terephthalate (PBT). PET copolymers, PEN copolymers, and PBT copolymers are also preferred. Specific co- and ter-polymers of interest are PET with combinations of isophthalic acid or its diester, 2,6 naphthalic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organo-magnesium, tin oxide, titanium alkoxides, dibutyl tin dilaurate, and germanium oxide. These catalysts may be used in combination with zinc, manganese, or magnesium acetates or benzoates. Catalysts comprising antimony are preferred. Because of this pellet's desirability in food packaging, other suitable polyesters and additives are listed in USA 21 CFR 177.1000-177.2910 (revised April, 1997 edition).

Another polyester example is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

Polymers used in this invention may also contain small amounts of phosphorous compounds, such as phosphates, and a catalyst such as a cobalt compound, that tends to impart a blue hue. This cobalt compound may or may not be a promoter. Other agents that may be included are infrared absorbers such as carbon black, graphite, and various iron compounds.

The melt phase polymerization described above may be followed by a crystallization step and then a solid phase polymerization (SSP) step to increase the molecular weight, as measured by Intrinsic Viscosity, necessary for bottle manufacture. The crystallization and polymerization can be performed in a tumbler dryer reaction in a batch-type system. Alternatively, the crystallization and polymerization can be accomplished in a continuous solid phase process whereby the polymer flows from one vessel to another after its predetermined thermal treatment in each vessel.

The crystallization conditions for PET preferably include a temperature of from about 100° C. to about 150° C. Typical thermal processing operations for crystallizing PET increase the crystallinity of the PET in the pellet by at least 5 percent. In the embodiments of this invention, the crystallinity of either component, such as PET, or polyamide, can be increased by 5 percent, or the increase in crystallinity of the two components combined can be 5 percent. It should be noted that the increase in the percent crystallinity is neither a weighted average of the components nor a percentage or value relative to the previous amount of crystallinity. An increase in the percent crystallinity, or increase in crystallinity is the absolute increase in crystallinity. When the crystallinity of PET and polyamide are combined, the increase in crystallinity is the absolute increase in crystallinity of the PET plus the absolute increase in crystallinity of the polyamide. For example, the phrase "an increase in crystallinity of at least 5 percent" means that at least 5 percent of the component has gone from amorphous to crystalline. It does not mean that a pellet with 20% crystallinity that undergoes a 5% increase in crystallinity has 21% crystallinity. It means that the pellet has 25% crystallinity. In many cases the increase in crystallinity will be an increase of at least ten percent and in some cases even as high as 15 to 20 percent.

The solid phase polymerization conditions preferably include a temperature of from about 200° C. to about 235° C., and more preferably from about 215° C. to about 235° C. The solid phase polymerization may be carried out for a time sufficient to raise the molecular weight to the desired level, which will depend upon the application and initial intrinsic viscosity. For a typical bottle application, the preferred molecular weight corresponds to an intrinsic viscosity from about 0.68 to about 0.88 deciliter/gram, as determined by the methods described in the methods section. The time required to reach this molecular weight may range from about 8 to about 45 hours. Typical increases in I.V. are at least 0.1 dl/g, with increases of 0.2 to 0.4 dl/g being more typical.

In one embodiment of the invention, the thermoplastic polymer matrix of the present invention may comprise recycled polyester or materials derived from recycled polyester, such as polyester monomers, catalysts, and oligomers.

If the polyester an oxygen inert component, then a polyamide can be the oxygen sensitive component. Polyamides suitable for being the oxygen sensitive component can be described as comprising the repeating unit amino caproic acid or A-D, wherein A is the residue of a dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4 cyclohexanedimethylamine, or a mixture thereof. These polyamides can range in number average molecular weight from 2000 to 60,000 as measured by end-group titration. These polyamides can also be described as the reaction product of amino caproic acid with itself and/or the reaction product of a residue of dicarboxylic acid comprising adipic acid, isophthalic acid, terephthalic acid, 1,4-cyclohexanedicarboxylic acid, rescorcinol dicarboxylic acid, or naphthalenedicarboxylic acid, or a mixture thereof with a residue of a diamine comprising m-xylylene diamine, p-xylylene diamine, hexamethylene diamine, ethylene diamine, or 1,4 cyclohexanedimethylamine, or a mixture thereof.

Those skilled in the art will recognize many of the combinations as well known commercially available polyamides. The reaction product of the residues of sebacic acid with hexamethylene diamine is nylon 610 and the reaction product of the residues of adipic acid and hexamethylene diamine is nylon 66. Nylon 612 is another nylon which benefits from the invention. Nylon 6 is a special type of polyamide which is made by the opening of caprolactam and then polymerizing the resulting amino caproic acid which has a formula of $H_2N-(CH_2)_5-COOH$. The preferred polyamide is the reaction product of the residues of adipic acid and m-xylene diamine, known as poly-m-xylylene adipamide. This product is commercially known as MXD6 or nylon MXD6 and can be purchased from Mitsubishi Gas Chemical Company, Japan.

Additionally, the polyamide may be modified with the monomers which create polyamide ionomers such as metallo-sulfonates. Included in these are the sulfonated isophthalate salts of lithium, sulfur, and phosphorous. These could be introduced for example as the dicarboxylic acid, pre-reacted diester, or diamine. U.S. Pat. No. 3,328,484, whose teachings are incorporated herein by reference, describes such modified co-polyamides.

Experimental Results

In all the experimental work, the polyester and polyamides were predried and the pellet size was 2 grams/100 pellets. The preferred pellet size is smaller than 1.5 grams/100 pellets and more preferably smaller than 1.8 grams/100 pellets.

Compartmentalized Oxygen Sensitive Components.

This series of experiments demonstrates the functionality of keeping the oxygen promoter away from the oxygen sensitive component.

In IA, (control sample), compartmentalized pellets were made by placing 95 percent by weight of the pellet of copolyethylene terephthalate (oxygen inert component) which is the low molecular weight feed resin (0.42 dl/g) used to make the 0.84 I.V. polyethylene terephthalate copolymer (CLEARTUF® MAX from M&G Polymers USA) into the sheath and 5 percent by weight of the pellet of MXD6 (Grade 6007 from Mitsubishi Gas Chemical, Japan) into the core.

In IB, the comparative example, a comparative example pellet was manufactured by homogeneously dispersing approximately 95 percent by weight of the pellet of the polyethylene terephthalate copolymer, approximately 5% by weight of the pellet of MXD6 (Grade 6007 from Mitsubishi Gas Chemical, Japan), and 125 parts per million of cobalt neodecanoate (Shepherd Chemical, 20.5%) The specific weights were 5396 grams of polyethylene terephthalate copolymer (oxygen inert component), 284 grams of MXD6 (oxygen sensitive component) and 0.71 grams of ground Cobalt neodecanoate pastilles (promoter).

In IC, the working example, compartmentalized pellets were made by placing approximately 95 percent by weight of the pellet of copolyethylene terephthalate and 125 parts per million by weight of the pellet of ground Cobalt Neodecanoate pastilles into the sheath and approximately 5 percent by weight of the pellet of MXD6 (Grade 6007 from Mitsubishi Gas Chemical, Japan) into the core.

In ID, the confirmatory example, the compartmentalized pellets of IC were repelletized to mix the core and sheath together.

All the pellets were made to the same size and then analyzed for oxygen scavenging at room temperature by placing approximately 4 grams of pellets into the gas chromatograph vial, sealing the vial and the analyzing the amount of oxygen scavenged. Each vial was only analyzed once. The seven day scavenging results are shown in Table I.

The test is highly variable at low levels of oxygen scavenging. Many polymers, in particular immediately after pelletizing, measure a low reactivity with oxygen which does not increase with time. For example, in IA, the system is non-reactive (no cobalt) and the one day sample showed 0.0104 cc while the seven day sample showed 0.0009 cc of oxygen reacted. The lack of oxygen reactivity of the invention (IC) is demonstrated by the low reactivity of day one which is similar to the control and no increase in oxygen consumption from day one to day seven. The confirmatory example showed similar low reactivity at day one, but a marked increase in oxygen consumption after seven days, indicating that the materials are reactive once combined in a homogeneous dispersion.

TABLE I

OXYGEN SCAVENGING STRUCTURE

| Construction | | cc O2 reacted per gram of pellets in 1 day | cc O2 reacted per gram of pellets in 7 days |
|---|---|---|---|
| IA Control | Sheath: 95% PET Core: 5% MXD6 | 0.0104 | 0.0009 |
| IB Comparative Example | homogenous dispersion of 95% PET, 5% MXD6, 125 ppm Co Neodecanoate | | 0.0210 |
| IC Working Example | Sheath: 95% PET, 125 ppm Co Neodecanoate Core: 5% MXD6 | 0.0113 | 0.0130 |
| ID Confirmatory Example - (IC repelletized) | Repelletized 5C homogenous dispersion of 95% PET, 5% MXD6, 125 ppm Co Neodecanoate | 0.0114 | 0.0346 |

It is believed that the similar results would be achieved if the components were cast into the side-by-side configuration.

Test Methods

Oxygen Reactivity

The amount of oxygen reacted by the pellets of the invention is determined and compared to a control pellet of similar size with the same amount of ingredients. In the case of the control, the ingredients are homogenously dispersed throughout the pellet. Or alternatively, the promoter is dispersed in the oxygen sensitive component which is then subsequently dispersed in the oxygen inert material.

The oxygen reactivity can be determined by placing pellets of the control into a sealed vessel and the same number of similar sized and weight compartmentalized pellets into a sealed vessel of the same size. The vessels are kept at the same temperature and the oxygen depletion in each vessel is measured at a certain point in time, preferably seven days. For example, one can place the same amount of same sized pellets into two gas chromatograph vials and sealed. Vial A will contain the homogeneous dispersion. Vial B will contain the embodiment. The vials are maintained in the same environment (temperature, preferably 23+/−5° C.) for seven days. The actual temperature level is not as essential as keeping both vials exposed to the same temperature profile over the seven days. After seven days, each vial is analyzed for its oxygen content. The reduction in oxygen content from atmospheric amounts of oxygen is the amount of oxygen scavenged or reacted. Variations in pellet weight are accounted for by dividing the amount of oxygen consumed by the amount of material in the vial and expressing the value in cubic centimeters of oxygen scavenged (reacted) per gram of polymer. If the pellets are the same size and equivalent number of pellets used, this normalizing adjustment is not necessary. The same test can be done by placing the pellets in a foil bag and analyzing the gas in the foil bag for the reduction in oxygen. The successful construction will consume at least 20 percent less oxygen than the control in the seven day period.

Intrinsic Viscosity

The intrinsic viscosity of intermediate molecular weight and low crystalline poly(ethylene terephthalate) and related polymers which are soluble in 60/40 phenol/tetrachloroethane was determined by dissolving 0.1 grams of polymer or ground pellet into 25 ml of 60/40 phenol/tetrachloroethane solution and determining the viscosity of the solution at 30° C.+/−0.05 relative to the solvent at the same temperature using a Ubbelohde 1B viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 grams of polymer or ground pellet into 25 ml of 50/50 trifluoroacetic acid/dichloromethane and determining the viscosity of the solution at 30° C.+/−0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is $$I.V.(\text{in 60/40 phenol/tetrachloroethane}) = 0.8229 \times I.V.(\text{in 50/50 trifluoroacetic acid/dichloromethane}) + 0.0124.$$

Crystallinity Determinations.

Determination of crystallinity can be done by any of the common techniques. However, for pellets containing multiple compounds in either method, the measured density or the required amounts of heat (DSC technique) are adjusted by the weighted average of the amount of the compound in the pellet.

Component Separation and Determination of the Amount of Component in the Pellet

The amount of each component in the pellet can be determined by many different techniques. For example, one can know how much of the compound was added when manufacturing the pellet, one can physically separate the components, or one can separate the components by dissolving the components away from each other, removing the solvent and taking the weight. In the case of polyamide-PET, formic acid can be used to dissolve the polyamide out of the core, leaving the PET sheath. The amount of PET can be directly weighed and the polyamide amount determined by difference. If the polyamide core contains other compounds which are not soluble in formic acid, the solution can be filtered and the polyamide precipitated from the formic acid by adding water. The sample is then dried and the amount of polyamide determined by direct weighing. In any case, small amounts of additives or other non-polyamide, non-PET materials would not affect the absolute value of the crystallinity to any great extent.

Once separated from the pellet, the individual crystallinity or intrinsic viscosity of the component can be determined. This invention is illustrated by the following examples that are merely for the purpose of illustration and are not to be regarded as limiting the scope of the invention or the manner in which it can be practiced. Unless specifically indicated otherwise, parts and percentages are given by weight.

We claim

1. A resin pellet comprising an oxygen sensitive component, an oxygen inert component and a reaction promoter wherein the oxygen sensitive component is present in a first compartmentalized zone, and wherein the oxygen inert component is present in a second compartmentalized zone and the first compartmentalized zone and second compartmentalized zone are configured in a side-by-side configuration whereby neither zone surrounds the other zone in any plane of the pellet.

2. A resin pellet as specified in claim 1 wherein the oxygen inert component comprises polyethylene terephthalate or a copolymer of polyethylene terephthalate.

3. A resin pellet as specified in claim 2 wherein the reaction promoter is a transition metal.

4. A resin pellet as specified in claim 3 wherein the transition metal is in the form of a transition metal salt and/or a transition metal oxide.

5. A resin pellet as specified in claim 3 wherein the transition metal is selected from the group consisting of cobalt, iron, manganese, and nickel.

6. A resin pellet as specified in claim 3 wherein the transition metal is cobalt.

7. A resin pellet as specified in claim 2 wherein the oxygen sensitive component comprises an oxidizable organic compound.

8. A resin pellet as specified in claim 7 wherein the reaction promoter is a transition metal.

9. A resin pellet as specified in claim 8 wherein the transition metal is in the form of a transition metal salt and/or a transition metal oxide.

10. A resin pellet as specified in claim 8 wherein the transition metal is selected from the group consisting of cobalt, iron, manganese, and nickel.

11. A resin pellet as specified in claim 8 wherein the transition metal is cobalt.

12. A resin pellet as specified in claim 7 wherein the oxygen sensitive component contains at least one compound selected from the group consisting of polybutadiene, functionalized polybutadiene, unhydrogenated polybutadiene oligomers, polypropylene oxide oligomers and methyl pendant aromatic compounds.

13. A resin pellet as specified in claim 7 wherein the reaction promoter is a transition metal.

14. A resin pellet as specified in claim 13 wherein the transition metal is in the form of a transition metal salt and/or a transition metal oxide.

15. A resin pellet as specified in claim 13 wherein the transition metal is selected from the group consisting of cobalt, iron, manganese, and nickel.

16. A resin pellet as specified in claim 13 wherein the transition metal is cobalt.

17. A resin pellet as specified in claim 2 wherein the oxygen sensitive component contains at least one compound selected from the group consisting of polybutadiene and functionalized polybutadiene.

18. A resin pellet as specified in claim 17 wherein the reaction promoter is a transition metal.

19. A resin pellet as specified in claim 18 wherein the transition metal is in the form of a transition metal salt and/or a transition metal oxide.

20. A resin pellet as specified in claim 18 wherein the transition metal is selected from the group consisting of cobalt, iron, manganese, and nickel.

21. A resin pellet as specified in claim 18 wherein the transition metal is cobalt.

22. A resin pellet as specified in claim 2 wherein the oxygen sensitive component comprises a polyamide selected from the group consisting of amino caproic acid reacted with itself, the reaction product of a residue of dicarboxylic acid selected from the group consisting of adipic acid, isophthalic acid, terephthalic acid, 1,4-cyclohexanedicarboxylic acid, rescorcinol dicarboxylic acid, or naphthalenedicarboxylic acid, or a mixture thereof with a residue of a diamine selected from the group consisting of m-xylylene diamine, p-xylylene diamine, hexamethylene diamine, ethylene diamine, or 1,4cyclohexanedimethylamine, or a mixture thereof.

23. A resin pellet as specified in claim 22 wherein the reaction promoter is a transition metal.

24. A resin pellet as specified in claim 23 wherein the transition metal is in the form of a transition metal salt and/or a transition metal oxide.

25. A resin pellet as specified in claim 23 wherein the transition metal is selected from the group consisting of cobalt, iron, manganese, and nickel.

26. A resin pellet as specified in claim 23 wherein the transition metal is cobalt.

27. A resin pellet as specified in claim 2 wherein the oxygen sensitive component comprises MXD-6 nylon, nylon 6, nylon 66, or mixtures thereof.

28. A resin pellet as specified in claim 27 wherein the reaction promoter is a transition metal.

29. A resin pellet as specified in claim 28 wherein the transition metal is in the form of a transition metal salt and/or a transition metal oxide.

30. A resin pellet as specified in claim 28 wherein the transition metal is selected from the group consisting of cobalt, iron, manganese, and nickel.

31. A resin pellet as specified in claim 28 wherein the transition metal is cobalt.

32. A resin pellet as specified in claim 2 wherein the oxygen sensitive component is the reaction product of predominately polycondensate segments comprised of one or more phthalates selected from the group consisting of terephthalate, orthophthalate, and isophthalate, wherein said polycondensate is further comprised of one or more glycols selected from the group consisting of alpha-hydroomega-hydroxy-poly (oxytetramethylene), 1,4 butanediol, polyethylene glycol and ethylene glycol and polyamides with a minor amount of oxygen sensitive moiety segments selected from the group consisting of functionalized polybutadiene, unhydrogenated polybutadiene oligomers, polypropylene oxide oligomers and methyl pendant aromatic compounds.

33. A resin pellet as specified in claim 32 wherein the reaction promoter is a transition metal.

34. A resin pellet as specified in claim 33 wherein the transition metal is in the form of a transition metal salt and/or a transition metal oxide.

35. A resin pellet as specified in claim 34 wherein the transition metal is cobalt.

36. A process for thermally treating a resin pellet comprising heating the resin pellet specified in claim 1 to a temperature which is within the range of 40° C. to a temperature which is at least 1° C. below the temperature at which the pellet becomes liquid.

37. The process of claim 36, wherein the thermal treatment comprises exposing the pellet to a temperature which is within the range of 70° C. to a temperature which is at least 5° C. below the temperature at which the pellet becomes liquid.

38. The process of claim 36, wherein the resin pellet is thermally processed in the temperature range for a time sufficient to increase the crystallinity of the first component or second component by at least 5 percent.

39. The process of claim 36, wherein the oxygen inert component is a first thermoplastic resin and the oxygen sensitive component is a second thermoplastic resin and the pellet is thermally processed in the temperature range for sufficient time so that the increase in crystallinity of the first component added to the increase in crystallinity of the oxygen inert component is at least 5 percent.

40. The process of claim 39, wherein the resin pellet has moisture prior to thermal processing, and the resin pellet is thermally processed in the temperature range for sufficient time to remove at least one-half of the moisture present prior to thermal processing.

41. The process of claim 39, wherein at least one of the thermoplastic resins has an I.V. of at least 0.2 dl/g prior to thermal treatment and wherein the resin pellet is thermally treated in the temperature range for sufficient time to increase the I.V. of the thermoplastic resin with an I.V. of at least 0.2 dl/g prior to thermal treatment by at least 0.1 dl/g.

42. The process of claim 39, wherein the first thermoplastic resin is a polyester selected from the group consisting of polyethylene terephthalate and crystallizable copolyethylene terephthalate.

43. The process of claim 42, wherein the thermal treatment comprises exposing the pellet to a temperature between 70° C. and a temperature which is 5° C. less than the crystalline melting point of the polyester.

44. The process of claim 42, wherein the resin pellet is thermally processed in the temperature range for a time sufficient to increase the crystallinity of the first component or second component by at least 5 percent.

45. The process of claim 42 wherein the oxygen sensitive component comprises a residue selected from the group consisting of a repeating unit of amino caproic acid and the repeating unit of A-D, wherein A is a residue of a dicarboxylic acid selected from the group consisting of adipic acid, isophthalic acid, terephthalic acid, 1,4-cyclohexanedicarboxylic acid, rescorcinol dicarboxylic acid, or naphthalenedicarboxylic acid, or a mixture thereof, and wherein D is a residue of a diamine selected from the group consisting of m-xylylene diamine, p-xylylene diamine, hexamethylene diamine, ethylene diamine, or 1,4 cyclohexanedimethylamine, or a mixture thereof.

46. The process of claim 45, wherein the thermal treatment comprises exposing the pellet to a temperature between 70° C. and a temperature which is 5° C. less than the crystalline melting point of the polyester.

47. The process of claim 45, wherein the resin pellet is thermally processed in the temperature range for a time sufficient to increase the crystallinity of the first component or second component by at least 5 percent.

48. The process of claim 45, wherein the resin pellet has moisture prior to thermal processing, and the resin pellet is thermally processed in the temperature range for sufficient time to remove at least one-half of the moisture present prior to thermal processing.

49. The process of claim 45, wherein at least one of the first or second thermoplastic resin has an I.V. of at least 0.2 dug prior to thermal treatment and wherein the resin pellet is thermally treated in the temperature range for sufficient time to increase the I.V. of the component with an I.V. of at least 0.2 dl/g prior to thermal treatment by at least 0.1 dl/g.

50. The process of claim 42 wherein the oxygen sensitive component comprises MXD-6 nylon, nylon 6, nylon 66, or mixtures thereof.

51. The process of claim 50, wherein the thermal treatment comprises exposing the pellet to a temperature between 70° C. and a temperature which is 5° C. less than the crystalline melting point of the polyester.

52. The process of claim 50, wherein the resin pellet is thermally processed in the temperature range for a time sufficient to increase the crystallinity of the first component or second component by at least 5 percent.

53. The process of claim 50, wherein the pellet is thermally processed in the temperature range for sufficient time so that the increase in crystallinity of the first thermoplastic resin added to the increase in crystallinity of the second thermoplastic resin is at least 5 percent.

54. The process of claim 50, wherein the resin pellet has moisture prior to thermal processing, and the resin pellet is thermally processed in the temperature range for sufficient time to remove at least one-half of the moisture present prior to thermal processing.

55. The process of claim 50, wherein at least one of the first or second thermoplastic resin has an I.V. of at least 0.2 dug prior to thermal treatment and wherein the resin pellet is thermally treated in the temperature range for sufficient time to increase the I.V. of the component with an I.V. of at least 0.2 dl/g prior to thermal treatment by at least 0.1 dl/g.

56. The process of claim 42, wherein the oxygen sensitive component comprises at least one compound selected from the group consisting of polybutadiene, functionalized polybutadiene, unhydrogenated polybutadiene oligomers, polypropylene oxide oligomers and methyl pendant aromatic compounds.

57. The process of claim 56, wherein the thermal treatment comprises exposing the pellet to a temperature between 70° C. and a temperature which is 5° C. less than the crystalline melting point of the polyester.

58. The process of claim 56, wherein the resin pellet is thermally processed in the temperature range for a time sufficient to increase the crystallinity of the first component or second component by at least 5 percent.

59. The process of claim 56, wherein the pellet is thermally processed in the temperature range for sufficient time so that the increase in crystallinity of the first thermoplastic resin added to the increase in crystallinity of the second thermoplastic resin is at least 5 percent.

60. The process of claim 56, wherein the resin pellet has moisture prior to thermal processing, and the resin pellet is thermally processed in the temperature range for sufficient time to remove at least one-half of the moisture present prior to thermal processing.

61. The process of claim 56, wherein at least one of the first or second thermoplastic resins has an I.V. of at least 0.2 dl/g prior to thermal treatment and wherein the resin pellet is thermally treated in the temperature range for sufficient time to increase the I.V. of the component with an I.V. of at least 0.2 dl/g prior to thermal treatment by at least 0.1 dl/g.

62. The process of claim 36 wherein the oxygen sensitive component contains at least one compound selected from the group consisting of polybutadiene and functionalized polybutadiene.

63. The process of claim 42, wherein the thermal treatment comprises exposing the pellet to a temperature between 70° C. and a temperature which is 5° C. less than the crystalline melting point of the polyester.

64. The process of claim 42, wherein the resin pellet is thermally processed in the temperature range for a time sufficient to increase the crystallinity of the first component or second component by at least 5 percent.

65. The process of claim 42, wherein the pellet is thermally processed in the temperature range for sufficient time so that the increase in crystallinity of the first thermoplastic resin added to the increase in crystallinity of the second thermoplastic resin is at least 5 percent.

66. The process of claim 42, wherein the resin pellet has moisture prior to thermal processing, and the resin pellet is thermally processed in the temperature range for sufficient time to remove at least one-half of the moisture present prior to thermal processing.

67. The process of claim 42, wherein at least one of the first or second thermoplastic resins has an I.V. of at least 0.2 dl/g prior to thermal treatment and wherein the resin pellet is thermally treated in the temperature range for sufficient time to increase the I.V. of the component with an I.V. of at least 0.2 dl/g prior to thermal treatment by at least 0.1 dl/g.

* * * * *